United States Patent
Herzig

(10) Patent No.: US 8,668,137 B2
(45) Date of Patent: *Mar. 11, 2014

(54) BARCODE SYSTEMS HAVING MULTIPLE VIEWING ANGLES

(75) Inventor: John Herzig, Richmond Hill (CA)

(73) Assignee: Barcode Graphics Inc., Richmond Hill, Ontario (CA)

(*) Notice: Subject to any disclaimer, the term of this patent is extended or adjusted under 35 U.S.C. 154(b) by 70 days.

This patent is subject to a terminal disclaimer.

(21) Appl. No.: 13/458,685

(22) Filed: Apr. 27, 2012

(65) Prior Publication Data

US 2012/0211567 A1 Aug. 23, 2012

Related U.S. Application Data

(63) Continuation-in-part of application No. 12/497,223, filed on Jul. 2, 2009, now Pat. No. 8,186,572.

(51) Int. Cl.
*G06F 17/00* (2006.01)

(52) U.S. Cl.
USPC .................................. 235/375; 235/462.05

(58) Field of Classification Search
USPC ............ 235/375, 462.01, 462.05, 462.09–11, 235/462.45, 472
See application file for complete search history.

(56) References Cited

U.S. PATENT DOCUMENTS

| | | | |
|---|---|---|---|
| 5,939,699 A | 8/1999 | Perttunen et al. |
| 6,384,980 B1 | 5/2002 | McKinley |
| 6,974,080 B1 | 12/2005 | Goggins |
| 7,337,948 B2 | 3/2008 | Melick et al. |
| 7,350,708 B2 | 4/2008 | Melick et al. |
| 7,520,427 B2 | 4/2009 | Boyd |
| 7,552,867 B2 | 6/2009 | Waltman |
| 7,909,243 B2 | 3/2011 | Merkow et al. |
| 8,186,572 B2 * | 5/2012 | Herzig .......................... 235/375 |
| 2004/0020988 A1 | 2/2004 | Omori |
| 2007/0215687 A1 | 9/2007 | Waltman |
| 2007/0284441 A1 | 12/2007 | Walczyk et al. |
| 2008/0017722 A1 | 1/2008 | Snyder et al. |
| 2008/0195536 A1 | 8/2008 | Karns et al. |
| 2009/0224033 A1 | 9/2009 | Waltman |
| 2010/0118217 A1 | 5/2010 | Yoon |

FOREIGN PATENT DOCUMENTS

| | | |
|---|---|---|
| EP | 1503327 A1 | 2/2005 |
| WO | 2006038096 A1 | 4/2006 |

OTHER PUBLICATIONS

Video Barcode: A New Technology Breakthrough, Tripletail Ventures, Inc., 2006.
http://en.wikipedia.org/wiki/PDF417, printed Mar. 3, 2009.
http://en.wikipedia.org/wiki/data_matrix_(computer), printed Mar. 3, 2009.

(Continued)

*Primary Examiner* — Daniel St. Cyr
(74) *Attorney, Agent, or Firm* — McCarter & English, LLP

(57) ABSTRACT

Methods and systems are described for communicating encoded information using barcodes. Symbologies that permit linking of two or more barcodes may be used to create animated linked barcodes, in which successive barcodes in the series that encodes a string of information are displayed within a display area of a dynamic medium. Barcode animations may be displayed in webpages, television broadcasts, video media, favicons, etc. An optical layer such as a lenticular lens may be used to affect display of different barcodes at different viewing angles.

23 Claims, 12 Drawing Sheets

(56) References Cited

OTHER PUBLICATIONS

Parallax barrier—Wikipedia, the free excyclopedia—http://en.wikipedia.org/wiki/Parallax barrier, printed Mar. 31, 2012.

Lenticular printing—Wikipedia, the free encyclopedia—http://en.wikipedia.org.wiki/Lenticular printing, printed Feb. 24, 2012.
United Kingdom Intellectual Property Office Search Report for Patent Application No. GB 1010968.4, dated Oct. 21, 2010.

* cited by examiner

US 8,668,137 B2

BARCODE SYSTEMS HAVING MULTIPLE VIEWING ANGLES

CROSS-REFERENCE TO RELATED APPLICATIONS

This application is a continuation-in-part of co-pending U.S. patent application Ser. No. 12/497,223, filed Jul. 2, 2009, titled "Systems and Methods for Animating Barcodes," the contents of which are herein expressly incorporated by reference as part of the present disclosure.

FIELD

Some example embodiments relate to barcodes and, for example, to systems and methods for animating barcodes or otherwise creating barcodes with improved data capacity.

BACKGROUND

Barcodes are a commonplace mechanism for encoding short pieces of data in a machine-readable format. They are ubiquitous in consumer packaging in the well-known UPC format, which is a linear or 1-dimensional (1D) barcode. Newer 2-dimensional (2D) formats, such as Quick Response (QR) codes or Datamatrix codes, are gaining widespread acceptance. Many camera-equipped mobile phones are now capable of scanning a printed 2D code to extract encoded data, for example a uniform resource locator (URL). The mobile phone may be configured to launch a browser and attempt to access the URL once the mobile phone has scanned and decoded such a barcode. In this manner, newspapers, advertisers and other print media are able to quickly link readers to an on-line version or the printed media or to a related website.

A problem that exists with barcodes is that they have a limited capacity. Attempts to put too much information into a barcode may lead to an excessively large barcode, which a mobile phone camera may lack the resolution to capture and decode properly. Moreover, an excessively large barcode may occupy too much space in printed media, thereby reducing the space available for paid advertising or other content.

It would be advantageous to provide for systems and methods of increasing the capacity of barcodes to store information and data. It would further be advantageous to provide for systems and methods that exploit non-print media for use of barcodes.

BRIEF DESCRIPTION OF THE DRAWINGS

Reference will now be made, by way of example, to the accompanying drawings which show example embodiments, and in which.

Similar reference numerals may have been used in different figures to denote similar components.

DESCRIPTION OF EXAMPLE EMBODIMENTS

Figure 1:
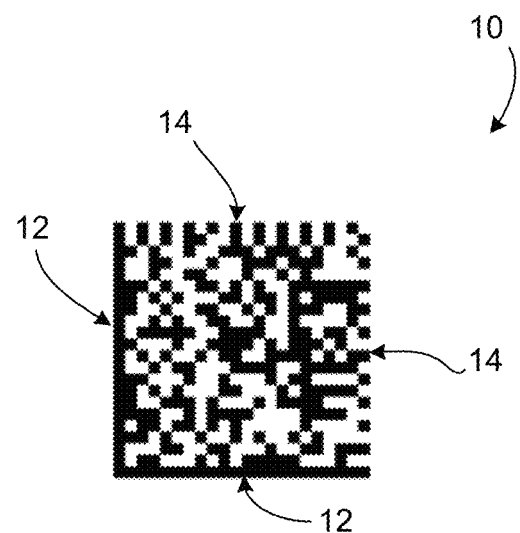
FIG. 1 shows an example Datamatrix barcode.

In one aspect, there is provided a method of communicating information. The method includes storing a series of two or more linked barcodes, wherein the information is encoded within the series of two or more linked barcodes; and displaying each of the barcodes in the series successively within a defined area in a dynamic media.

In another aspect, there is provided a method of providing encoded information. The method includes receiving an information string; encoding the information string within a series of two or more linked barcodes; and storing the series of two or more linked barcodes as an animation configured to display each of the barcodes in the series successively.

In yet a further aspect, there is provided a computer-readable medium storing computer-readable instructions for configuring a processor, wherein the computer-readable instructions including instructions for performing any of the methods described herein.

In yet another aspect, there is provided a method that includes generating a barcode encoding a short URL; storing a webpage addressed using the short URL, wherein the webpage includes a redirection instruction referencing a longer URL; receiving a request for the webpage; and transmitting the webpage in response to the request.

In yet another aspect, there is provided a display system for communicating information, including a display including a series of two or more linked barcodes, wherein the information is encoded within the series of two or more linked barcodes, and an optical layer for affecting display of different images of the display at different viewing angles, each barcode being displayed at a different viewing angle.

In yet another aspect, there is provided a display system for communicating information, including a display including a first barcode and a second barcode, the first barcode and the second barcode being of a series of two or more linked barcodes, wherein the information is encoded within the series of two or more linked barcodes, and an optical layer for affecting display of different images of the display at different viewing angles, the first barcode being displayed at a first viewing angle and the second barcode being displayed at a second viewing angle.

In yet another aspect, there is provided a method of communicating information on a display system, the display system including a display and an optical layer for affecting display of different images of the display at different viewing angles. The method includes: displaying at a first viewing angle a first barcode of a series of two or more linked barcodes, wherein the information is encoded within the series of two or more linked barcodes; and displaying at a second viewing angle a second barcode of the series of two or more linked barcodes.

In yet another aspect, there is provided a non-transitory computer-readable medium storing computer-readable instructions for communicating information on a display screen, wherein the display screen is affected by an optical layer for affecting display of different images of the display screen at different viewing angles. The computer-readable instructions include instructions defining a series of two or more linked barcodes, wherein the information is encoded within the series of two or more linked barcodes, instructions for displaying a first barcode of the series of two or more linked barcodes on the display screen, the first barcode being associated with a first viewing angle, and instructions for displaying a second barcode of the series of two or more linked barcodes on the display screen, the second barcode being associated with a second viewing angle.

Other aspects and example embodiments will be apparent to those of ordinary skill in the art from a review of the following detailed description in conjunction with the drawings.

Some example embodiments are not limited to any particular operating system, mobile device architecture, server architecture, or computer programming language.

In the present disclosure, the term "barcode" is used to refer to any one of a variety of images that encode information using visual elements, excluding text. Example barcodes include linear or 1-D barcodes, like UPC, and 2-D barcodes, like Datamatrix, QR codes, PDF 417, Semacode, and many others.

Reference is first made to FIG. 1, which shows an example Datamatrix barcode 10. Like most barcodes, the Datamatrix barcode 10 includes a pre-defined pattern or arrangement of elements that allows a reader to identify the barcode 10 and its orientation. In the case of Datamatrix, the barcode 10 includes a finder pattern 12, which includes two solid black borders in an "L" shape, which enables a scanner or code reader to identify the location and orientation of the barcode 10. The other two borders include alternating black and white cells. These two borders are called a timing pattern 14. The timing pattern 14 tells the reader how many rows and columns are in the barcode 10. Within the borders 12, 14 are cells encoding information. For example, the barcode 10 in FIG. 1 encodes the phrase, "This is an example barcode".

Datamatrix is only one example of a 2D barcode. Others, such as QR codes, also include pre-defined elements that provide the reader with information regarding the location, orientation, and size of the barcode.

2D barcodes, and in particular QR codes, are becoming increasingly popular as a means to communicate information to handheld devices, like mobile phones. Many mobile phones are equipped with cameras, and many are capable of running software that uses the camera to scan barcodes. In this manner, many mobile phones are configured to scan a barcode printed, for example, in a newspaper, on a flyer, or on a billboard, and decode a URL or other remote address link encoded within the barcode. The mobile phone may, in some cases, automatically launch a browser application and pass the URL or other link to the browser, which may then attempt to access the URL or other link.

There are often limits set by their technical specifications or standards as to how much data may be encoded within a particular barcode. Datamatrix can encode up to 3116 characters from the ASCII character set. It has a size that ranges from 10×10 to 144×144 cells. A QR code can encode up to 4,296 alphanumeric characters.

It will also be appreciated that, although their specifications may allow these types of barcodes to encode this much data in a single code, practically the scanner (especially in the case of mobile phones) may have insufficient resolution to properly decode a barcode with a dense cell matrix. The barcodes may also need to be kept to a coarse resolution because the screen or media upon which they are rendered may have insufficient resolution to display a barcode with fine details. In the case of print media, lower quality printing may result in ink bleed or other artifacts that obscures the delineations between cells and makes decoding difficult. In the case of video display of a barcode, such as on a computer screen, a television screen, or on a mobile phone screen, the size and resolution of the display screen will limit the possible density of the barcode. In cases where the barcode is intended to be scanned at a distance, such as when the barcode is on a billboard, sign, building, etc., the barcode needs to be sufficiently large and avoid an overly dense matrix since it may be difficult for some scanners, such as mobile phones, to accurately read such a barcode from a distance.

Because there are both preset and practical limits to the amount of information that may be encoded in a barcode, some barcode specifications permit "linking" of barcodes. That is, a flag or other indicia may be set within a barcode that alerts the reader/scanner to the fact that this barcode is one of a series. The scanner/reader is used to scan each of the barcodes, typically printed alongside each other, and it then compiles or combines the decoded information from the series of barcodes. The "linking" protocol for a given barcode symbology may provide that information encoded in the barcodes includes the number of barcodes in the series and each particular barcode provides its location in the series. The reader or scanner may then scan the barcodes in any order and later arrange them correctly, appending the decoded information from each barcode to the information from the others to assemble the complete decoded information. The "linking" of barcodes is sometimes termed a "structured append".

Figure 2:
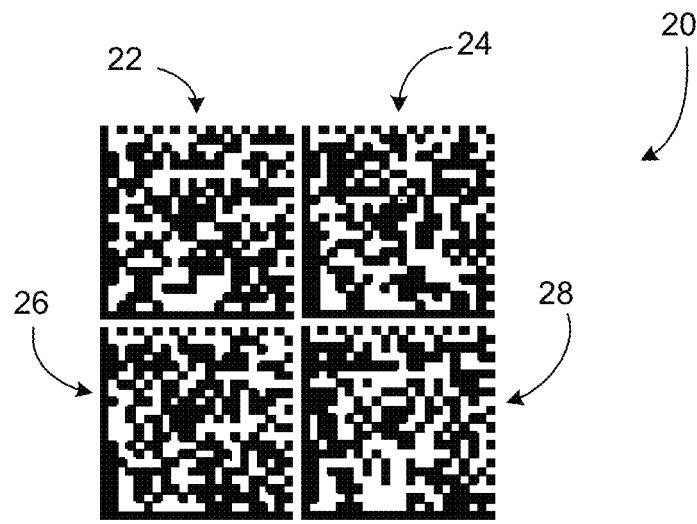
FIG. 2 shows an example series of linked Datamatrix barcodes.

Reference is now made to FIG. 2, which shows an example series of linked Datamatrix barcodes 20. In this example, four barcodes (individually 22, 24, 26, 28) are used to encode the text: "This is a much longer example that will use multiple barcodes to encode the full phrase".

In addition to Datamatrix, other 2D symbologies permit linking, including QR code, PDF417, microPDF417, and Aztec. In some cases 1D symbologies may also permit linking, for example code 128.

It will be appreciated that linking multiple barcodes enables the encoding of a larger quantity of information using smaller barcodes, but does not ultimately result in a smaller use of space since the linked barcodes are each printed, usually in close proximity to one another. It may be appreciated in some embodiments that an advantage of using a number of smaller linked barcodes rather than one large barcode may be that the scanner may be better able to focus upon and decode the smaller barcodes individually, whereas one large barcode may have details too fine to recognize and decode. Additionally, the linked barcodes may be laid out or arranged in an arbitrary manner on the printed page or product to which they are applied, whereas one large barcode is less flexible.

Figure 3:
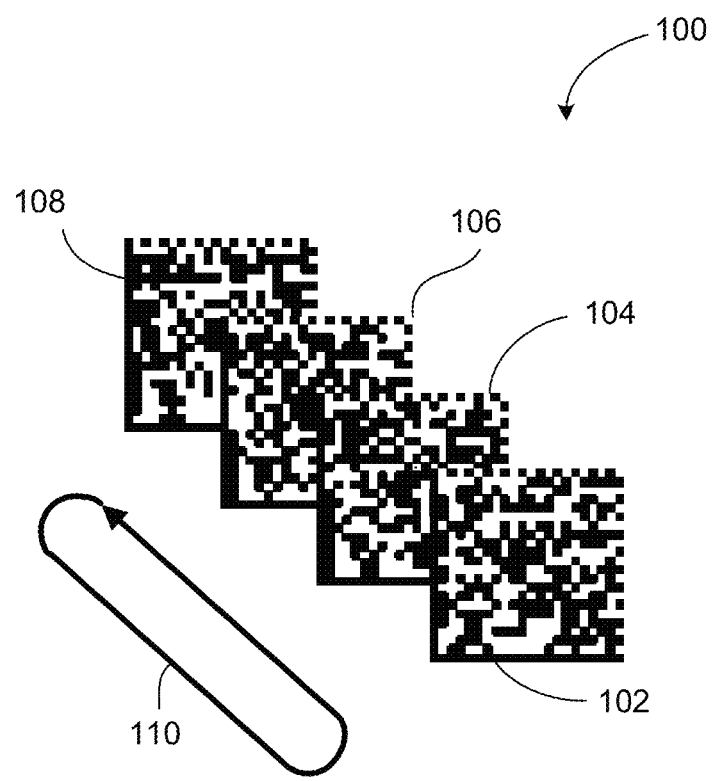
FIG. 3 graphically illustrates an animated barcode in accordance with an example embodiment.

Reference is now made to FIG. 3, which graphically illustrates an animated barcode 100 in accordance with an example embodiment. The animated barcode 100 is for display within dynamic media. For example, the animated barcode 100 may be displayed on a video screen, television screen, projection screen, mobile phone display screen, or any other device capable of displaying dynamic, i.e. changeable, content.

The animated barcode 100 includes two or more linked barcodes (individually 102, 104, 106, 108). The barcodes 102, 104, 106, 108 are successively displayed one after another within a display space or region. In some cases, they may be interlaced with blank/white space to signal the change between successive barcodes 102, 104, 106, 108. In some embodiments, the display of the barcodes 102, 104, 106, 108 is looped as indicated by the arrow 110, meaning the successive display is repeated in a loop. To an observer, the animated barcode 100 may appear as a video, with each barcode being a frame of the video.

It may be appreciated that the successive display of the linked barcodes 102, 104, 106, 108 may permit a scanner to capture or scan each individual barcode in turn as it is displayed. The full encoded information from the linked series of barcodes is obtained by the scanner, but the animated barcodes 100 only occupy the space of a single barcode. In other words, the animated barcodes 100 are a 3-dimensional barcode, with time as the third dimension. The speed with which the successive barcodes are displayed may be a fraction of a second or longer, depending on the expected time required by the scanner to identify and scan the individual barcodes as they are displayed.

The linked barcodes 102, 104, 106, 108, in the series may, in some embodiments, be displayed in their proper order in the series; however, in some embodiments they may be displayed in a different order and the barcode reader may be configured to rearrange the decoded information to reassemble it in the correct order.

Although FIG. 3 illustrates the example animated barcode 100 as a series of Datamatrix codes, it will be appreciated that any other 1D or 2D symbology/barcode capable of being linked may be used, including code 128, QR codes, PDF417, etc. It will also be appreciated that although FIG. 3 shows four individual barcodes, some embodiments may have as few as two or three barcodes in the series, and some may have many more.

Figure 4:
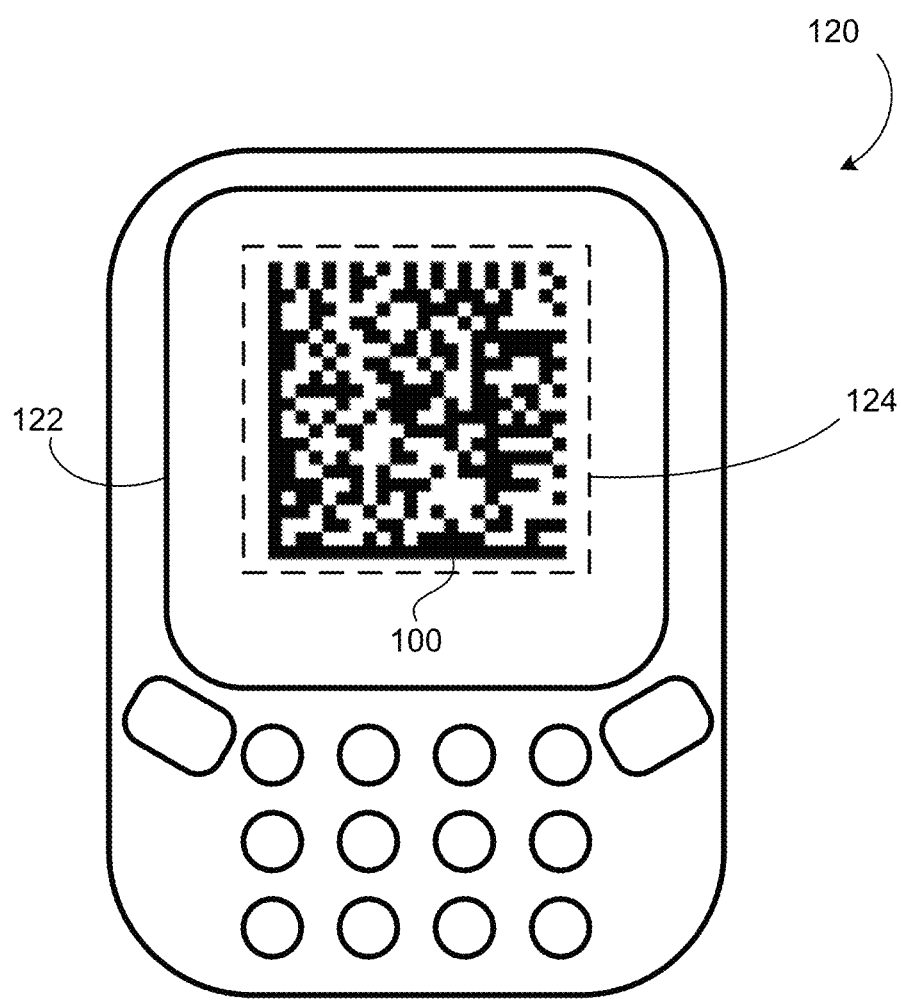
FIG. 4 diagrammatically shows a front view of a mobile handheld device.

Reference is now made to FIG. 4, which diagrammatically shows a front view of a mobile handheld device 120. The mobile handheld device 120 includes a display screen 122. The display screen includes a defined region or area 124 within which the animated barcode 100 is displayed. Given the relatively small size of the display screen 122 on the mobile handheld device 120 in this embodiment the defined area 124 occupies most of the display screen 122.

In this embodiment, the animated barcode 100 may comprise an animated GIF or other file type in which a series of bitmaps or other images are displayed successively. For example, later versions of PNG and other image standards may permit animations. The animated barcode 100 may be stored as a file in memory on the mobile handheld device 120 and may be played or rendered using an imaging application, browser or other such software resident in memory on the device 120. In some cases, depending on the file type, the animated barcode 100 may be played using a plug-in to a browser. For example, a Flash player or other such plug-in may be used to display the animated barcode 100.

In another embodiment, the animated barcode 100 may be rendered as part of a webpage or other such document downloaded, perhaps wirelessly, to the mobile handheld device 120. In yet another embodiment, the animated barcode 100 may be streamed to the mobile handheld device 120 from a remote location.

In yet a further embodiment, the mobile device 120 may include code generating software for creating the animated barcode 100 and for displaying it on the display screen 122. For example, the user may cause launch of the code generating software through an icon or menu selection, and may input a text phrase or other information for encoding by the code generating software. The code generating software, executing upon a processor within the mobile handheld device 120, may generate a series of barcode images that encode the text phrase or other information supplied by the user. It may then, automatically or on instruction from the user, display the series of barcode images as the animated barcode 100.

Figure 5:
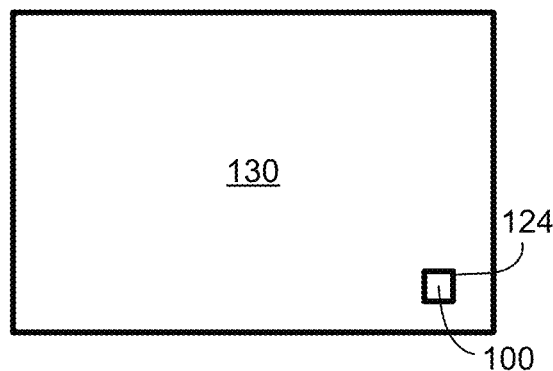
FIG. 5 shows an example display screen.

Reference is now made to FIG. 5, which shows an example display screen 130. The display screen 130 may be a part of any system for viewing dynamic media. For example, the display screen 130 may be the monitor of a personal computer; it may be an LCD, plasma or other screen of a television; it may be a projection screen from a home or commercial theatre; and it may be a video billboard screen. It will be understood that these are examples only and are not intended as limitations.

The display screen 130 includes the defined area 124 in which the animated barcode 100 is displayed. The defined area 124 is a portion or subarea within which the animation is displayed. In the case of a mark-up language document, such as a webpage, the defined area 124 is a field or component defined within the layout of the page. In the case of a video for television, the defined area 124 is a portion of the video in which the animated barcode 100 has been embedded. In some cases, the animated barcode 100 may have been embedded or inserted in post-processing, such as by a television broadcaster to provide information regarding the broadcast or the television station. It may, for example, encode a link to a station website or to a website associated with the particular content being shown, such as a television program. In one example application, the animated barcode 100 for a given television program may link to the same broadcast in a mobile phone optimized format, thereby enabling a viewer to continue to watch the program using their mobile phone if leaving the vicinity of the television. In another example application, the animated barcode 100 may link to an online, e.g. YouTube™, version of the television program.

Figure 6:
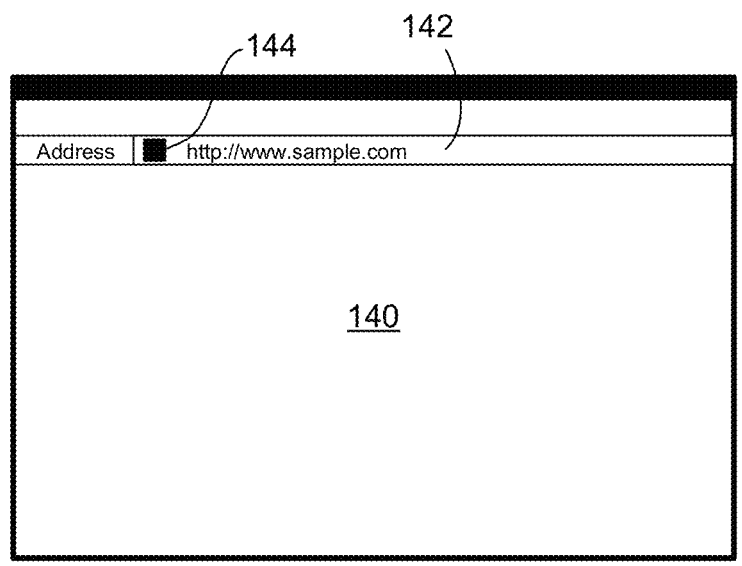
FIG. 6 shows the graphical user interface of an example browser application.

Reference is now made to FIG. 6, which shows the graphical user interface of an example browser application 140. Many browsers have a field in which they display the URL or other identifier of the webpage currently being accessed by the browser. In the example browser application 140 this is shown as address field 142. The address field 142, as is typical, displays the URL, such as http://www.sample.com. The URL or address is often preceded in the field by an icon, usually termed a "favicon". The term "favicon" is short for favorites icon, and is sometimes also referred to as a website icon, bookmark icon, shortcut icon, or url icon. It is a small icon associated with the webpage or domain. In many cases it is used to display a corporate logo or other unique identifier associated with the webpage or domain.

A favicon is typically 16×16 or 32×32 pixels and is displayed in the address field, or, in some tabbed browsers on a tab. It may appear elsewhere in other embodiments. Some browsers now support the use of animated formats for favicons. Accordingly, in FIG. 6, an animated favicon 144 is shown in the address field 142. The animated favicon 144 is an animated barcode. The animated favicon 144 may encode the URL or address currently shown in the address field 142.

The use of an animated barcode as a favicon permits a mobile handheld device user to scan the favicon displayed on a browser of a conventional computer screen and thereby easily "grab" the URL or link. The mobile handheld device may be configured to automatically (i.e. without further user command or intervention) launch the mobile phone browser and access the link. In other embodiments, the mobile handheld device may be configured to save the URL, perhaps in the browser's favorites list, or elsewhere in memory.

Figure 7:
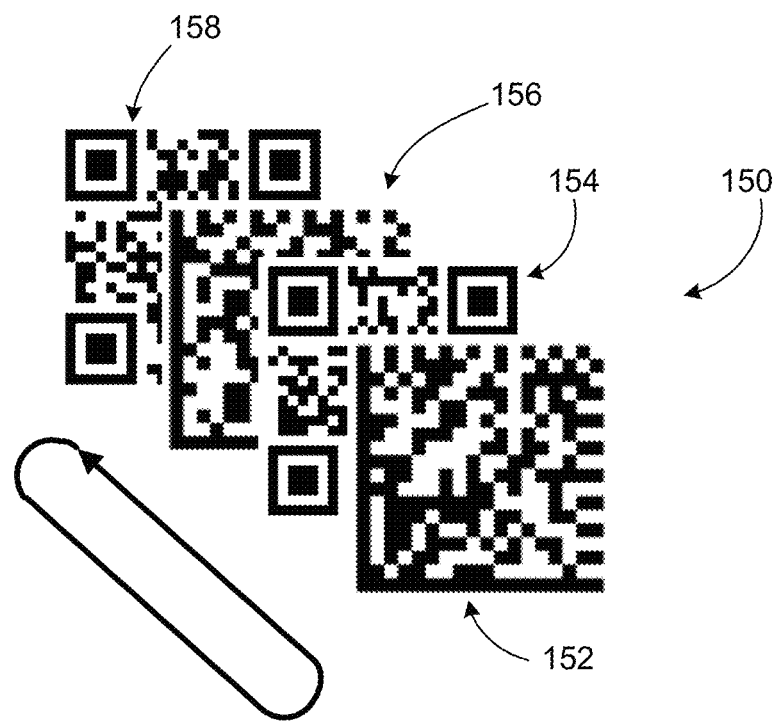
FIG. 7 shows an example interleaved barcode.

It will be appreciated that mobile phones and other handheld code readers may be configured to read only particular types of barcodes symbologies). Accordingly, in one embodiment, multiple symbologies encoding the same information may be interleaved. Reference is now made to FIG. 7, which shows an example interleaved barcode 150. The example interleaved barcode 150 includes two symbologies: a Datamatrix code and a QR code. In this embodiment, individual barcodes of the two symbologies are interleaved one after another. For example, the interleaved barcode 150 begins with a first Datamatrix barcode 152 from the Datamatrix series, followed by a first QR code 154 from the QR code series. Then follows the second Datamatrix barcode 156, followed by the second QR code 158, and so on.

It will be appreciated that other interleaving may be realized in other embodiments. For example, the animated barcode 150 could successively display all barcodes in the Datamatrix series followed by all barcodes in the QR code series.

If a code reader, such as a mobile phone, is capable of reading more than one symbology present in an interleaved animated barcode, the mobile phone may be configured to select one for reading and ignore the other or it may be configured to read both symbologies, which may assist in detecting and/or correcting errors.

In some embodiments the animated barcode 100 (FIG. 3) or the interleaved animated barcode 150 (FIG. 7) may have non-barcode images interleaved within the series. For example, a logo or other image may be interleaved within the series of barcodes.

Figure 8:
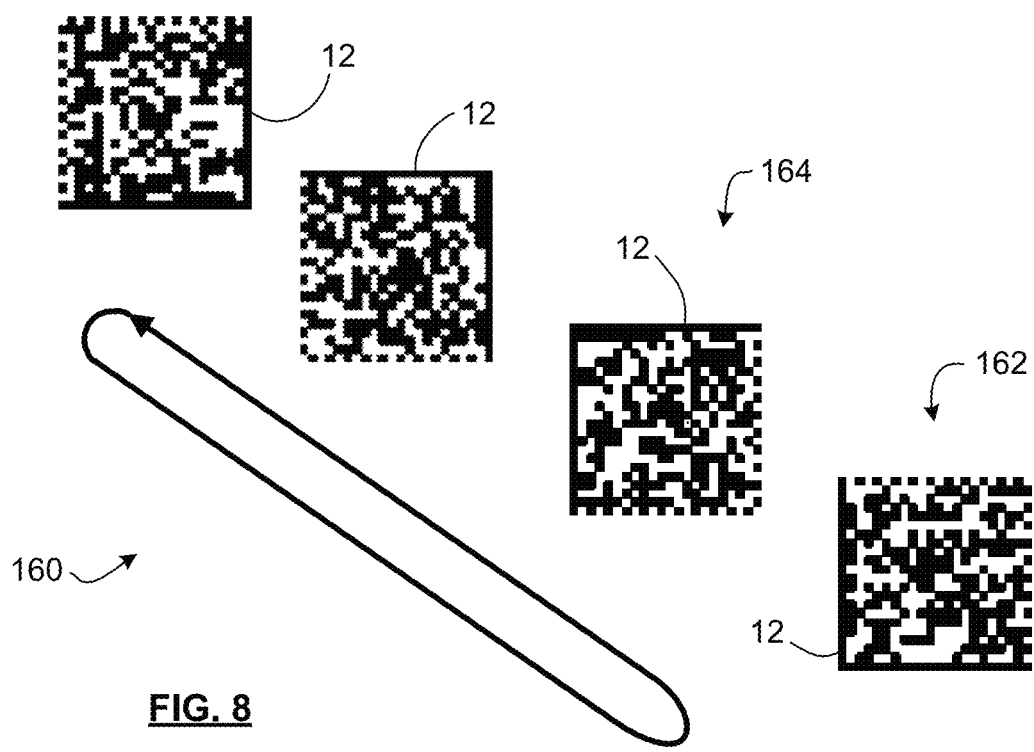
FIG. 8 shows an example of a rotating animated barcode.

Referring now to FIG. 8, an example of a rotating animated barcode 160 is illustrated. In some instances, to assist the code reader in detecting or recognizing the change from one barcode to the next on in the series, the images may be interleaved with blank or white space, or other indicators of a change. In another embodiment, as illustrated in FIG. 8, alternatively to or in addition to the interleaved white space, the barcodes may be rotated in orientation. Accordingly, the finder patterns 12 are oriented differently in adjacent codes in the series. Therefore, when a transition occurs from, for example, the first barcode 162 to the second barcode 164, the code reader may detect the change in the finder pattern.

Although FIG. 8 illustrates the change from one barcode to the next as involving a 90 degree rotation, other changes in orientation may also be used. For example, 180 degree rotation may be used. Rotations may be clockwise or counterclockwise. Other angles may also be used, particularly in the case of circular barcodes.

For example, in some embodiments the rotation of the barcodes may also aid the code reader in determining, from detection of the finder patterns, whether it has already captured and decoded the displayed barcode image without the need to re-capture it and re-decode it to recognize it.

Other techniques may also be used to improve detection of the animated barcodes, or to increase the data capacity of the animated barcodes. For example, colour channels may be used to increase the capacity of a barcode image. Two or three animated barcodes having the same dimensions may be combined into a single animated colour barcode having the same dimensions. Each of the two or three animated barcodes may be designated as either green, red, or blue, to correspond to the RGB colour channels. When combined, the resulting animated barcode includes red, green, blue or multi-colour cells. A code reader configured to read the animated colour barcode filters each individual barcode image into red, green and blue components, thereby obtaining three barcodes from a single colour image. It will be appreciated that the above three-colour channel barcode is not necessarily limited to animated barcodes and may be employed in the case of a printed barcode as well.

Figure 9:
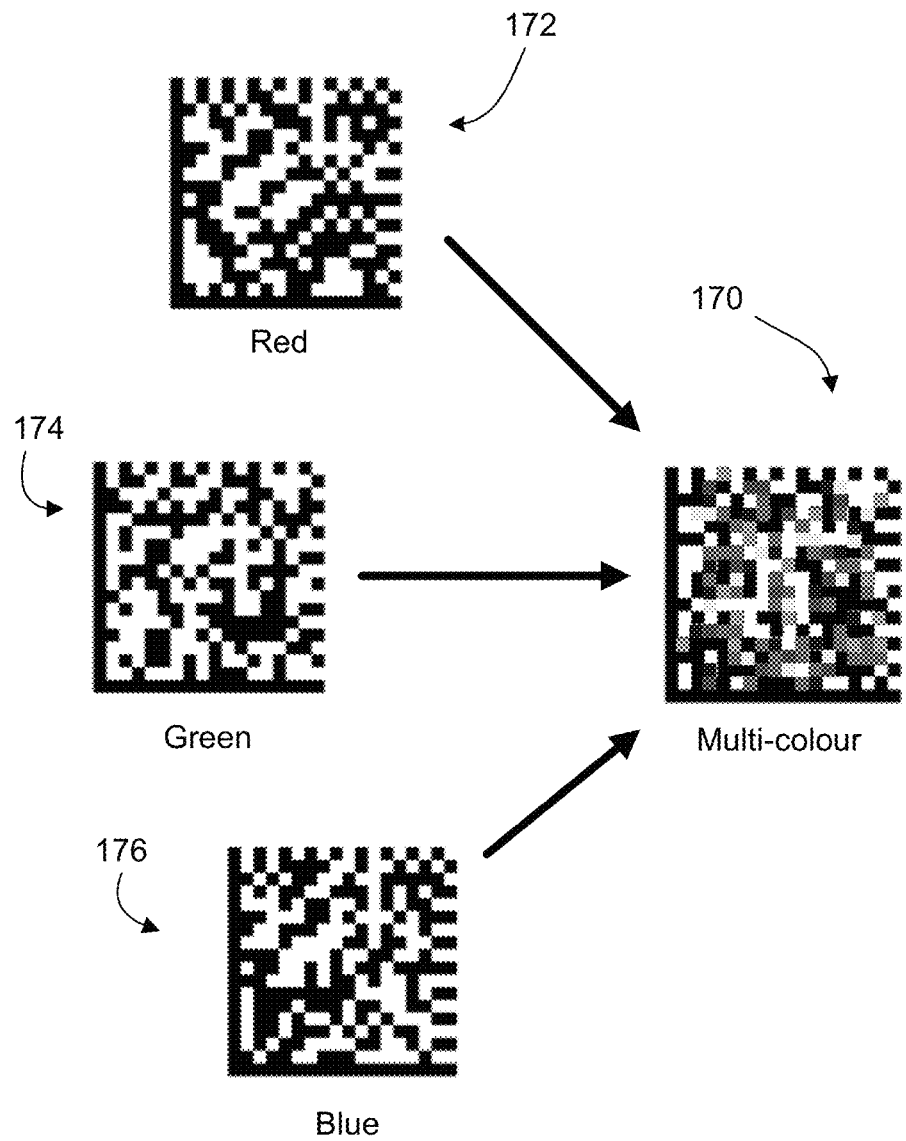
FIG. 9 graphically illustrates the creation of a tri-colour channel barcode.

Reference is made to FIG. 9, which graphically illustrates the creation of a tri-colour channel barcode 170. Individual barcode images 172, 174, 176 are designated as a red barcode 172, a green barcode 174 and a blue barcode 176. When combined, the red, green and blue cells of the individual barcode images 172, 174, 176 result in a set of red, green, blue, and multi-colour cells within the tri-colour channel barcode 170.

It will be understood that dual-colour channel barcodes may be created in combinations of red-blue, blue-green, or green-red.

Figure 10:
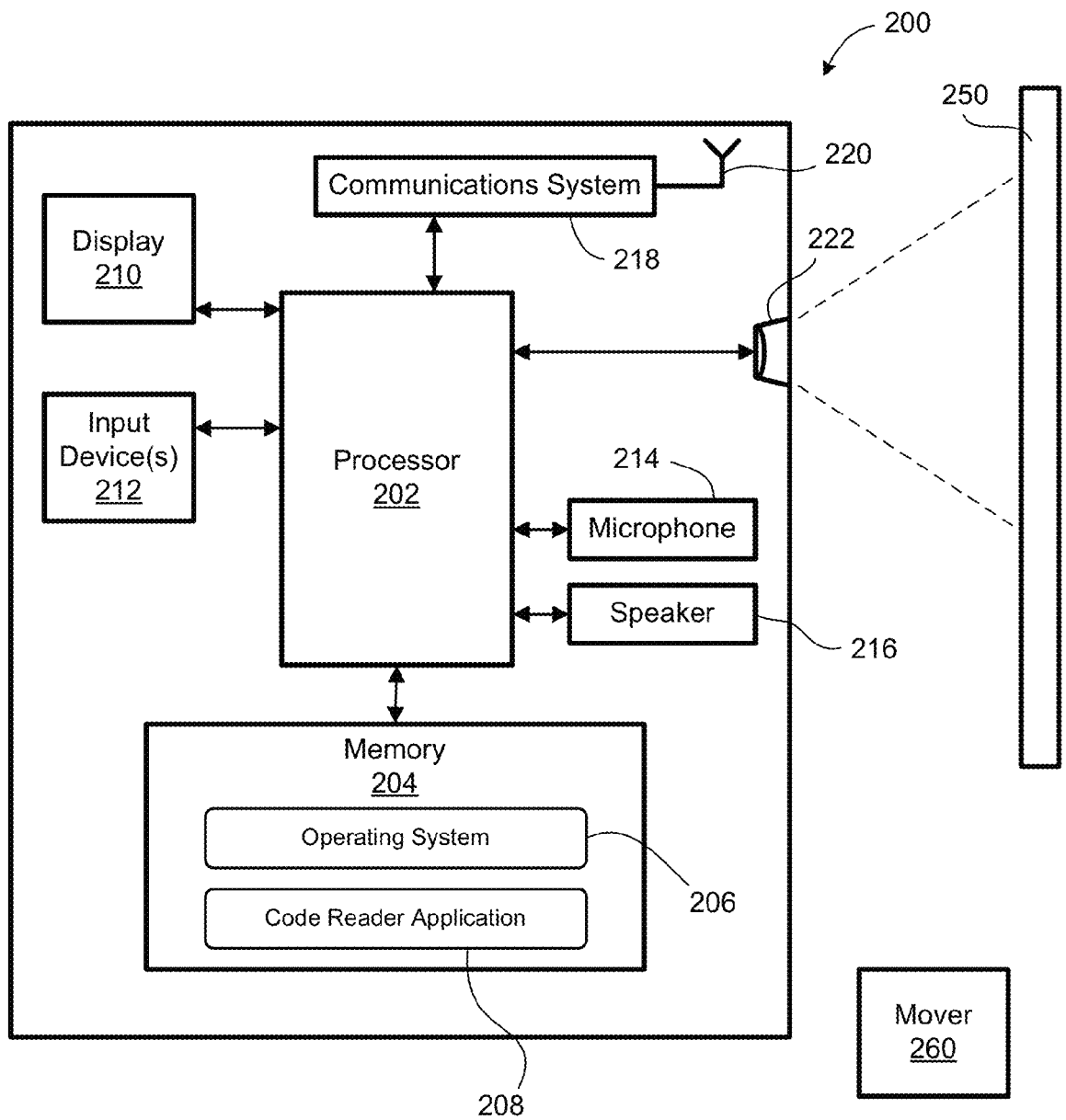
FIG. 10 shows, in block diagram form, a code reader in accordance with an example embodiment.

Reference is now made to FIG. 10, which illustrates, in block diagram form, a code reader 200 in accordance with an example embodiment. The code reader 200 is, in this embodiment, a mobile handheld device. In some embodiments the code reader 200 may be configured for wireless communications via a wireless network. The code reader 200 may be configured for data communications, voice communications, or both. With regard to data communications, the code reader 200 may be configured to send and receive data, including HTTP requests and responses, using TCP/IP protocol. The wireless network may include a public land mobile network (PLMN); for example, a network configured in accordance with any one of a number of protocols, including GSM/GPRS, EDGE, 3GPP, CDMA, etc. In other embodiments, the wireless network may be a wireless local area network configured to operate in accordance with one of the IEEE 801.11x protocols. In other embodiments, the wireless network may be any other type of wireless network configured to enable mobile communications.

The code reader 200 includes a processor 202 and memory 204. The memory 204 may include RAM, ROM, Flash memory, or any combination thereof. It will be appreciated that the memory 204 may include an operating system 206 and various software applications or modules. The operating system 206 and the software applications contain computer-readable instructions executable by the processor 202, and implemented so as to configure the processor 202 to carry out defined steps or operations and to perform certain device functions or operations.

The software applications include a code reader application 208. Although illustrated separately, the code reader application 208 may be part of the operating system 206 or any of the other software applications.

The code reader 200 may include a display device 210, input device(s) 212, a microphone 214, and a speaker 216. The input device(s) 212 may include a full or reduced keyboard or keypad, a trackball, a trackwheel, a touchscreen, and/or a directional pad. The code reader 200 may also include a communications subsystem 218 and associated antenna 220 for wireless communications with the wireless network, as described above.

The code reader 200 also includes a camera 222. The camera 222 may include an electronic image sensor, such as a charge coupled device (CCD) for receiving light through a lens and converting the light intensity to image data. The captured image data defines an image or video received by the camera 222. The camera 222 may have a mechanical shutter in some embodiments; although many embodiments employ an interline or frame-transfer type of CCD, eliminating the need for a mechanical shutter.

Also illustrated in FIG. 10 is a display screen 250, on which is displayed a barcode. In one embodiment, the displayed barcode is animated. The code reader 200 may be held such that the barcode is within the field of view of the camera 222 and, as described below, the code reader 200 may capture and decode the barcode.

The code reader application 208 receives image data from the camera 222. The image data may be temporarily loaded into memory 204. The code reader application 208 scans the image data in an attempt to locate a finder pattern. If the code reader application 208 identifies the finder pattern then it may attempt to decode the associated barcode in the image. The code reader application 208 may apply certain filters or other techniques to the image data in order to try to improve the quality of the data and the likelihood of detecting a valid finder pattern or correctly decoding the barcode.

With an animated barcode, once the code reader application 208 has detected and captured one frame/barcode of the series, it may then continue to monitor image data received from the camera 222 and attempt to detect a change in the displayed barcode. It may, in some embodiments, attempt to identify a change in the orientation of the finder pattern. It may, in other embodiments, attempt to identify an interleaved blank/white/black space, which serves as an indicator of a change in the displayed barcode. Other techniques may also be used to indicate to the code reader application 208 the transition between successive barcodes in the series.

The code reader application 208 continues to monitor for and decode successive barcodes in the animated barcode until it has all barcodes in the series. It then combines the decoded information from each of the barcodes in its correct sequence.

It would be appreciated that the series of successive barcodes may not be necessarily be displayed or received in order of sequence. In some examples, one or more barcode frames may be missed or un-recorded for various reasons. As the barcodes may be repeated in a loop (e.g. arrow 110, FIG. 3), the missing barcode frames may, for example, be captured in a next recurrence of the displayed barcodes. The use of linking or structured append may be used to properly decode or assemble the proper order of the series of barcodes, for example using an appropriate identifier which identifies the order of each barcode within the series of barcodes.

After decoding and (if applicable) combining, the code reader application 208 may be configured to display the decoded information on the display device 210. It may be configured to launch a browser application and access a remote address, such as a URL, within the decoded information. It may be configured to save the decoded information in memory 204. It may, in some embodiments, be configured to take some other action in response to the decoding of the encoded information.

It will be appreciated from the foregoing description that barcodes may be useful for providing mobile devices with links to online content, perhaps by URL. One difficulty with this is that barcodes store a limited amount of content. As noted above, animated barcodes are able to store a greater amount of information the same physical dimensions. Nevertheless, some URLs are excessively long and may be difficult to encode in a barcode. Moreover, URLs are subject to change as website designers alter the structure of their websites and content. Accordingly, a URL encoded in a barcode may become out-of-date if the corresponding website is altered in a manner that changes the URL. For example, a URL that is intended to link to a particular page of up-to-date content may cease to function if a website redesign results in the renaming of that webpage.

Figure 11:
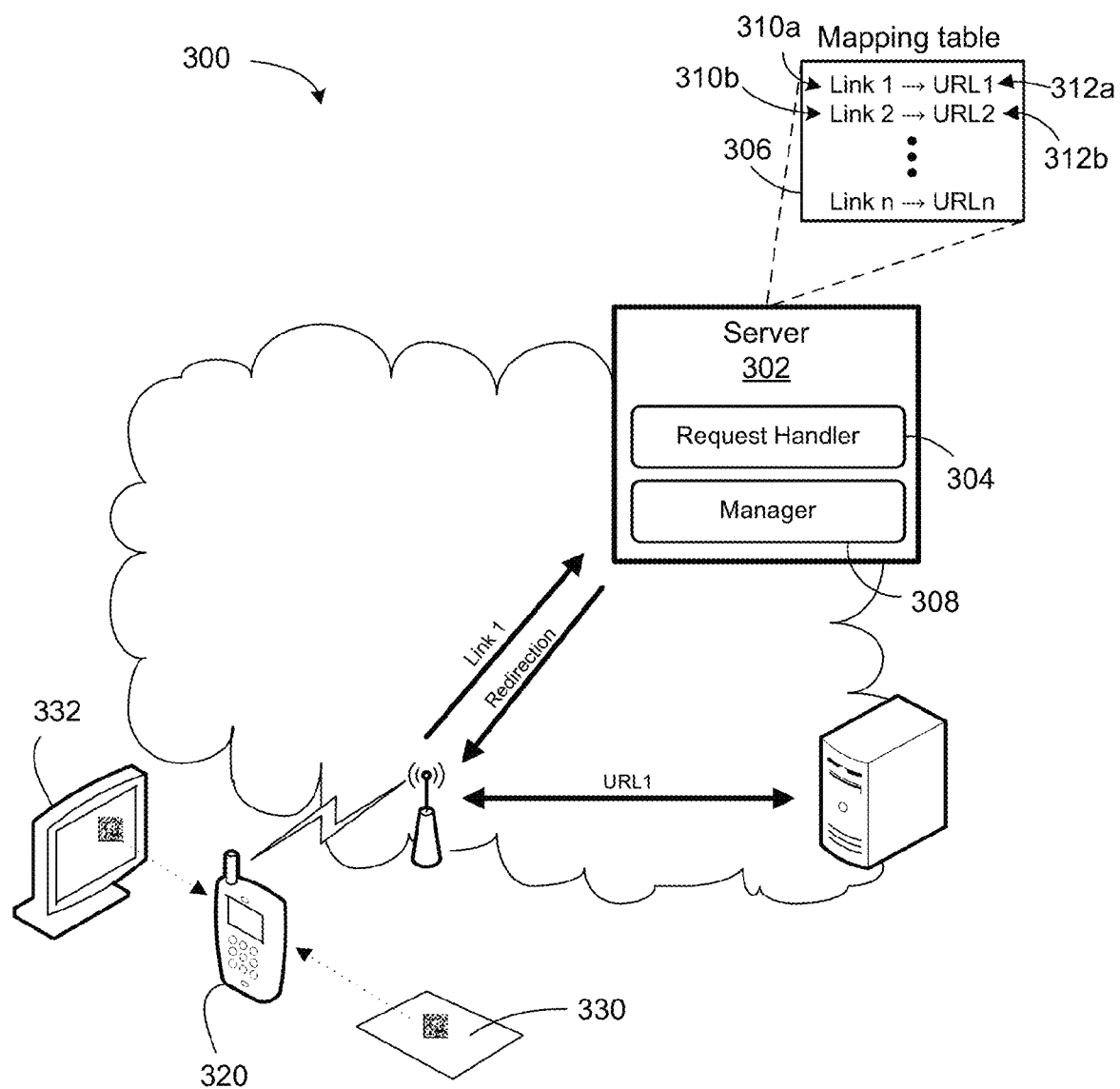
FIG. 11 diagrammatically shows a system in accordance with an example embodiment.

Reference is now made to FIG. 11, which diagrammatically shows a system 300 in accordance with an example embodiment. The system 300 allows a webpage host or designer to encode a relatively short link within a barcode. The relatively short link is associated with the actual full length URL. A browser accessing the relatively short link is redirected to the actual full length URL, giving the webpage host or designer the freedom to distribute barcodes encoding the short link and then change, as often as desired, the actual URL to which the barcode reader would be redirected based on the short link.

The system 300 includes a server 302 which, in some embodiments, is configured as a database. The server 302 is connected to a wide area network (WAN), such as the Internet, and includes a request handler 304, such an HTTP daemon, for handling incoming requests from remote entities. The server 302 may also include or be connected to a memory containing a mapping table 306. Although termed a "table" in this example it will be understood that the mapping table 306 need not be in table format and may be organized in another data structure. It may, in some embodiments, be stored as a database, such as a relational database. In some other embodiments, it may be stored as a look-up table in memory. In yet another embodiment, described below in connection with FIG. 12, the mapping table may be avoided by storing links within HTML pages.

Referring still to FIG. 11, the mapping table 306 stores associations between links (310a, 310b) and full URLs (312a, 312b). Only two associations are shown for convenience. The links 310a, 310b are short URLs that resolve to the server 302. The short URLs are compact unique addresses that the server 302 is able to map to their associated URLs 312a, 312b.

The server 302 may also include a manager 308. The manager 308 includes an interface through which administrators or authorized users may be permitted to edit the associations for which they have editing privileges. For example, the administrator of the server 302 may have editing privileges with regard to all the associations. A registered user of the server 302 may only have editing privileges with regard to the associations that they have created themselves.

In one embodiment, the server 302 includes a barcode generator. Through the manager 308, a registered user may request the encoding of a particular URL. The manager 308 may create a unique short link 310 for storage in the mapping table 306 in association with the particular URL and may then provide the requesting registered user with a barcode image encoding the short link 310. In some embodiments, the registered user may be given the option of various types of barcode images, i.e. different symbologies. In some embodiments, the manager 308 may be configured to generate an animated barcode and/or an animated interleaved barcode, as described above. The registered user may be provided with a downloadable copy of the animated barcode file. In one embodiment, the user may request a physical non-animated barcode. The administrator or owner of the server 302 may print one or more copies of the non-animated barcode on suitable physical media, for example a label. The non-animated barcode encodes the short link 310. In one embodiment, the non-animated barcode may be a colour barcode, such as was described above in connection with FIG. 9.

As illustrated in FIG. 11, a mobile handheld device 320 configured to read barcodes may scan a barcode and obtain one of the short links 310. It may be configured to launch a browser (if not already running) and transmit a request (e.g. an HTTP request) to access the decoded short link 310. The request is received by the server 302 and in particular the request handler 304. Based on the association in the mapping table 306, a redirection instruction is sent to the mobile handheld device 320 causing the mobile device's browser to send an HTTP request addressed to the associated URL 312.

It will be appreciated that the mobile handheld device 320 may be configured to read printed static barcodes 330, or animated barcodes 332, or both.

Figure 12:
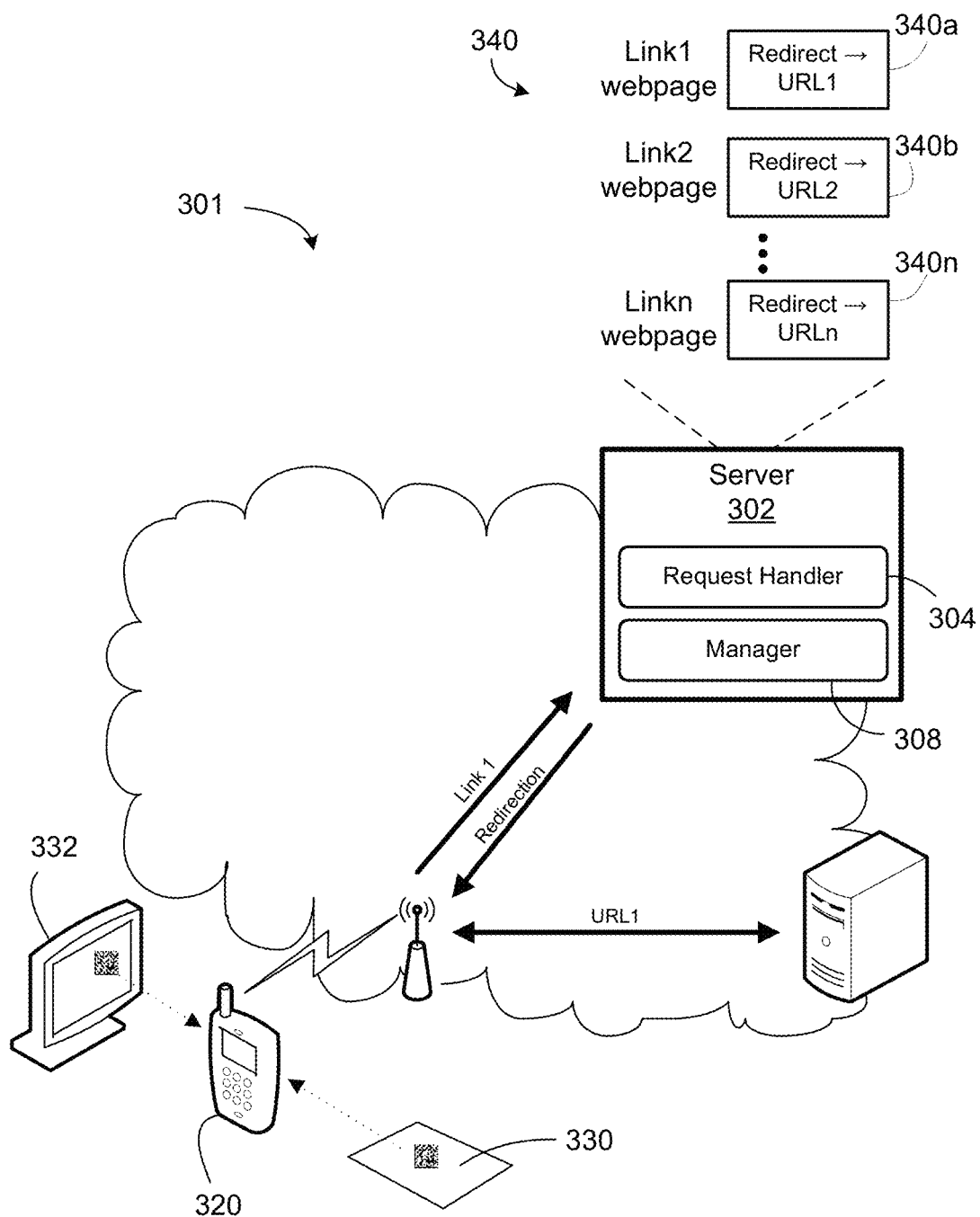
FIG. 12 shows another embodiment of a system in accordance with an example embodiment.

Those ordinarily skilled in the art will appreciate that the system 300 may be implemented such that a database lookup is required at the server 302. In another embodiment, it may be possible to avoid maintaining a database of associations. Reference is now made to FIG. 12, which shows an alternative system 301. The system 301 includes a server 302, as shown in FIG. 11, configured as a webserver. In this embodiment, instead of maintaining a mapping table, the server 302 stores webpages (indicated generally as 340). In particular, the server 302 includes a webpage 340 for each of the short links. For example, webpage 340a is specifically for link 1. The webpages 340 are each structured to include a redirection to the associated URL. Those ordinarily skilled in the art of web programming will appreciate that a redirection may be placed in the header portion of a webpage. Moreover, it will be appreciated that a delay time before redirection occurs may be incorporated into the webpage.

By causing the short link to obtain a specific webpage 340, the registered user may, in one embodiment, adjust his or her associated URL by editing their webpage 340. In another embodiment, the registered user may input a new associated URL, for example through a web interface provided by the manager 308, and the manager 308 may be configured to recreate the webpage 340 (or a new webpage 340) incorporating the new associated URL.

Moreover, the registered user or the owner of the server 302 may cause an advertisement or other content to be displayed to a user before the redirection occurs. In other words, the webpage 340 for a particular short link 310 may include a graphic, image, or other content, that the user's browser downloads and displays before the redirection takes effect. The content may include an advertisement, in some cases related to the subject matter associated with the short link 310 or URL 312.

In one example embodiment, the system 301 is used for barcodes encoding short links for particular real estate listings. The barcodes may be animated or non-animated, depending on the implementation. The non-animated barcodes are intended for placement on real estate signs, for example on a physical sign located at the property for sale. A prospective buyer may scan the barcode on the real estate signage and be automatically taken to the associated webpage 340 via the short link. The associated webpage 340 may display relevant advertisement or other information, such as details of the listing agent or agency, before redirecting the prospective buyer to specific webpage for the listing using its URL. The URL for a specific real estate listing accessible through the online realtors portal is typically very lengthy. Animated barcodes encoding the short link or the URL may be used in dynamic media, such as on a real estate television program.

Figure 13:
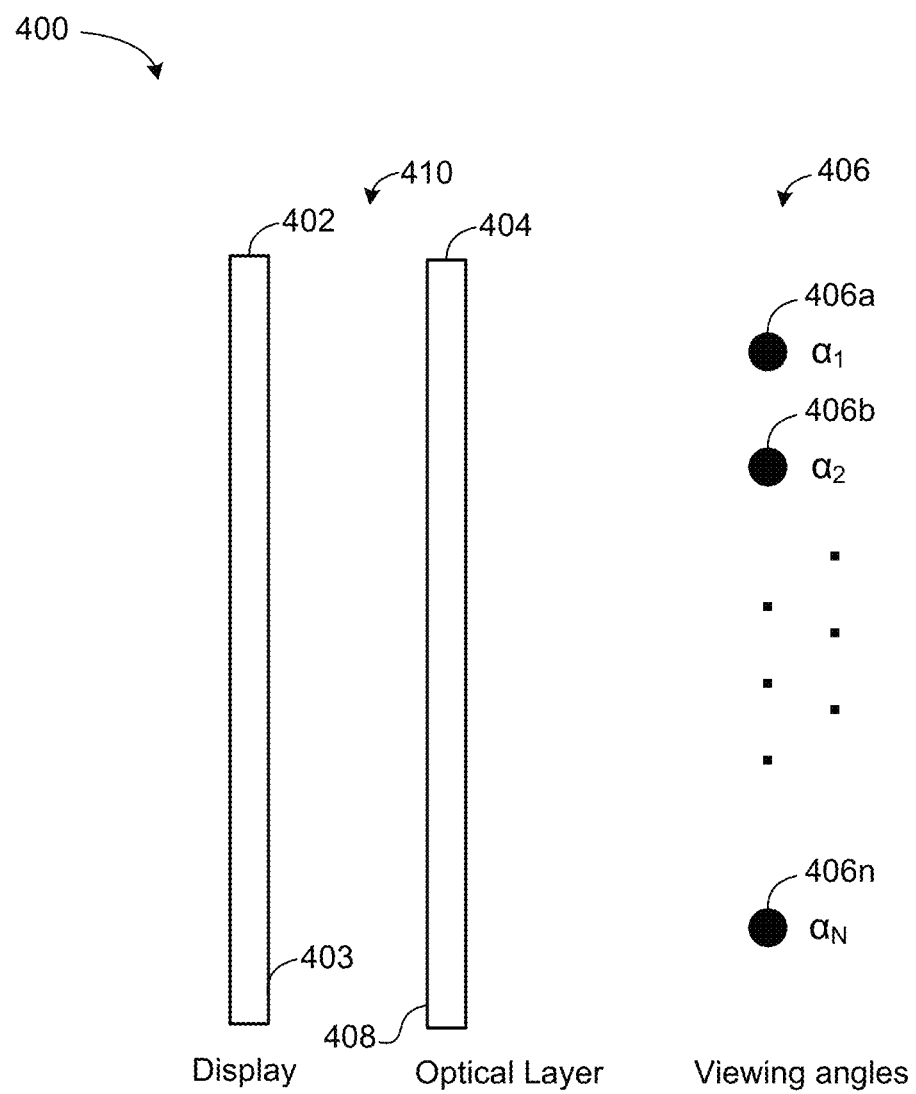
FIG. 13 diagrammatically shows a barcode display system having multiple viewing angles in accordance with an example embodiment.

Reference is now made to FIG. 13, which diagrammatically shows a barcode display system 400 for affecting multiple viewing angles, in accordance with an example embodiment. Generally, the display system 400 may affect or permit for different linked barcodes to each be displayed at different viewing angles (each or collectively referred to as 406). As shown in FIG. 13, the display system 400 includes a display 402 and an optical layer 404. The display 402 may include at least an image displayed on a display surface 403. The optical layer 404 may include material, structures, and/or defined apertures which affect or permit display of different parts or images of the display 402 at different viewing angles 406. For example, the optical layer 404 provides varying or variable display of the display 402 in dependence of the viewing angle 406. The viewing angles are shown as first viewing angle 406a, second viewing angle 406b, etc., to the Nth viewing angle 406n. A detector or viewer (not shown) would generally detect or see a different image in dependence of the viewing angle 406. The display 402 can include two or more images which are interleaved, for example each image may be associated or assigned to a particular viewing angle 406, and be excluded from at least some of the other viewing angles 406. The display 402 can include thereon a series of two or more linked barcodes for display, wherein information is encoded within the series of two or more linked barcodes. Each barcode of the series of barcodes may, for example, be assigned or associated with a particular viewing angle 406 or angles. By way of example, first viewing angle 406a may be associated with a first barcode displayed on the display 402, second viewing angle 406b may be associated with a second barcode displayed on the display 402, etc., up to the Nth viewing angle 406n being associated with a Nth barcode of the series displayed on the display 402.

In some example embodiments, still referring to FIG. 13, the barcodes of the series of barcodes may be interleaved within a same defined area of the display 402, for example as strips. Thus, for example, at a given viewing angle 406 only one of the barcodes may be viewable or displayed from the defined area, while the remaining barcodes may not be viewable or displayed from the defined area.

In some example embodiments, the display 402 includes a static print or printed image on the display surface 403. The printed image provides a static construct which has the appearance of a dynamic image and/or 3D image, for example due to changes in the viewing angle 406. In some example embodiments, the display 402 comprises a print which is printed onto a rear surface 408 of the optical layer 404.

In some example embodiments, the display 402 includes a video display screen, such as a projector, cathode ray tube (CRT) or liquid crystal display (LCD), depending on the particular application. The video display screen may be used to dynamically display the barcodes using video. In some further example embodiments, the barcodes may themselves be animated as described in detail herein.

In some other example embodiments, the optical layer 404 is joined to or at the display 402. In some other example embodiments, a space 410 is provided or defined between the optical layer 404 and the display 402. For example, air, a spacer, or other materials (e.g. for rigidity or further optical effect) may be located at the space 410 between the display 402 and the optical layer 404. Some example embodiments of the optical layer 404 may include lenticular lenses and/or parallax barriers, described next in greater detail.

Figure 14:
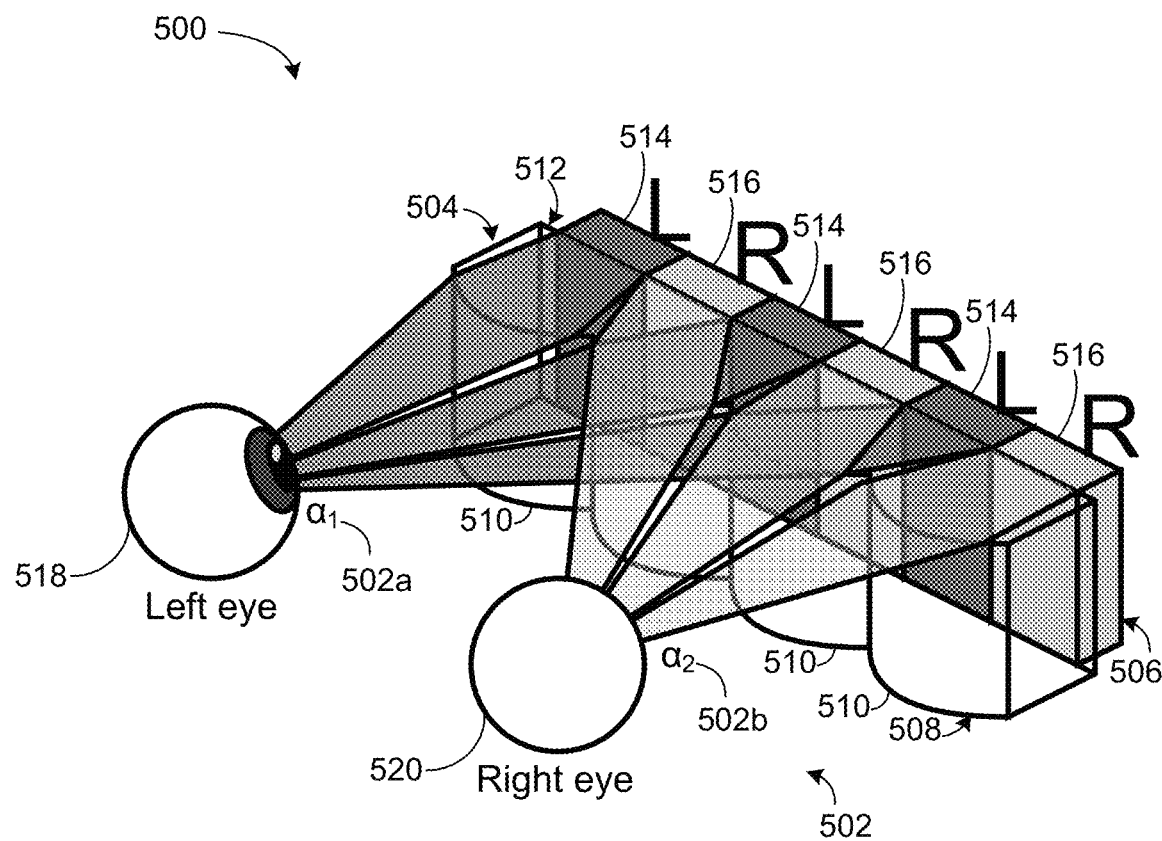
FIG. 14 diagrammatically shows a perspective view of a lenticular display system in accordance with an example embodiment.

Reference is now made to FIG. 14, which show a lenticular display system 500 in accordance with an example embodiment. For ease of illustration, only two viewing angles 502a, 502b (each or individually referred to as 502) are described, with the understanding that additional viewing angles 502 for additional barcodes may be provided. Generally, lenticular-type systems may be understood to produce images with an illusion of depth, or the ability to change or move as the system is viewed from different angles. Examples of lenticular-type systems include transforming images, stereoscopic (3D) effects, animations, advertising graphics, 3D prints and 3D video displays or televisions.

Generally, the lenticular display system 500 may provide for different linked barcodes to each be individually displayed at a different viewing angle 502. As shown in FIG. 14, the lenticular display system 500 includes a lenticular lens 504 and a display 506. The lenticular lens 504 includes a ribbed surface 508 comprising a plurality of lenticules 510 and a flat rear surface 512. Each lenticule 510 may be identical or substantially identical to another. Each lenticule 510 may be, for example, cylindrical shaped or spherical shaped. The display 506 may include images which are interleaved or interlaced, for example a first image 514 and a second image 516. The first image 514 may be displayed at a first viewing angle 502a and the second image 516 may be displayed at a second viewing angle 502b. In some example embodiments, the first image 514 includes a first barcode of a series of linked barcodes, and the second image 516 includes a second barcode of the series of barcodes. The composite of the first image 514 and the second image 516 may be collectively referred to as a "lenticular image".

For example, the lenticular image can show two or more different images (at least some of the images including a barcode) by changing the viewing angle 502 from which the display 506 is viewed. If additional (e.g. 30 or more) images are used, taken in a sequence, a short animation can be displayed (and received by a user or detector device). Different barcodes may be associated with at least some of the different viewing angles 502 or "frames" of such an animation. In some other examples, one can use several images of the same object, taken from slightly different angles, and then display a lenticular image which shows a stereoscopic 3D effect. For example, first viewing angle 502a may be directed to a user's left eye 518, and second viewing angle 502b may be directed to a user's right eye 520. In some examples, 3D effects are achieved in a side to side (left to right) horizontal direction, with the lenticules 510 being oriented vertically, as the viewer's left eye 518 is positioned at a slightly different viewing angle than the right eye 520 to achieve the stereoscopic effect. In some examples, other effects such as morphs, motion, and zooms may be better suited (e.g. less ghosting or latent effects) as top-to-bottom vertical effects, with the lenticules 510 oriented horizontally, with the understanding that such effects may also be achieved with the lenticules 510 being oriented vertically.

In some examples embodiments, the first image 514 and the second image 516 are interleaved as strips within the lenticular image. The lenticules 510 are aligned with the strips of each of the images 514, 516, so that the light or image from each strip is refracted in a slightly different direction, so that the light or image from all strips originating from the same original image is sent to the same viewing angle 502. For example, the end result is that a single eye or detector looking at the lenticular image sees a single whole image, and both eyes 518, 520 can see different images, which can be used for stereoscopic 3D perception.

The lenticular lens 504 may, for example, be formed of various suitable materials such as polyvinylchloride (PVC), Amorphous Polyethylene Terephthalate (APET), acrylic, and Polyethylene Terephthalate Glycol (PETG), as well as other suitable materials. For example, suitable materials may require a suitable index of refraction as well as suitable rigidity to maintain integrity of the viewing angles 502.

An example application of the lenticular display system 500 is a transforming print or "flip effect". For example, two or more different images may be used, wherein the lenses are selected to require a relatively large change in viewing angle to switch from one image to another. This allows viewers to readily see the original images, since small movements cause no change. Larger movement of the viewer or the print causes the image to flip from one image to another. Different linked barcodes may be included in some or all of the images.

Another example application of the lenticular display system 500 is an animated print. In such examples, the distance between different angles of view requires a moderate change, so that while both eyes usually see the same image, changing the viewing angle a moderate amount switches to the next image in the series. Many sequential images may be used, with only small differences between each image and the next. This can be used to create an image that moves ("motion effect"), or can create a "zoom" or "morph" effect, in which part of the image expands in size or changes shape as the angle of view changes. Different linked barcodes may be included in some or all of the images.

Another example application of the lenticular display system 500 is for a stereoscopic effect. In such examples, a change in viewing angle needed to change images is relatively small, so that each eye sees a slightly different view. This creates a 3D effect without requiring special glasses. Different linked barcodes may be included in some or all of the images In some example embodiments, the display 506 is printed, including the lenticular image, which includes the barcodes. In some example embodiments, the first image 514 and the second image 516 appear to a detector as being generally located within a same defined area, even though they are printed as different interleaved strips. In other example embodiments, the display 506 is a video display screen, with the lenticular image and barcodes being generated or rendered by a computer device. Such barcodes may be further animated in some example embodiments, providing an additional degree of encoding. In some examples, during a video display, the first barcode and the second barcode may be displayed at different times as well as at different viewing angles.

Figure 15:
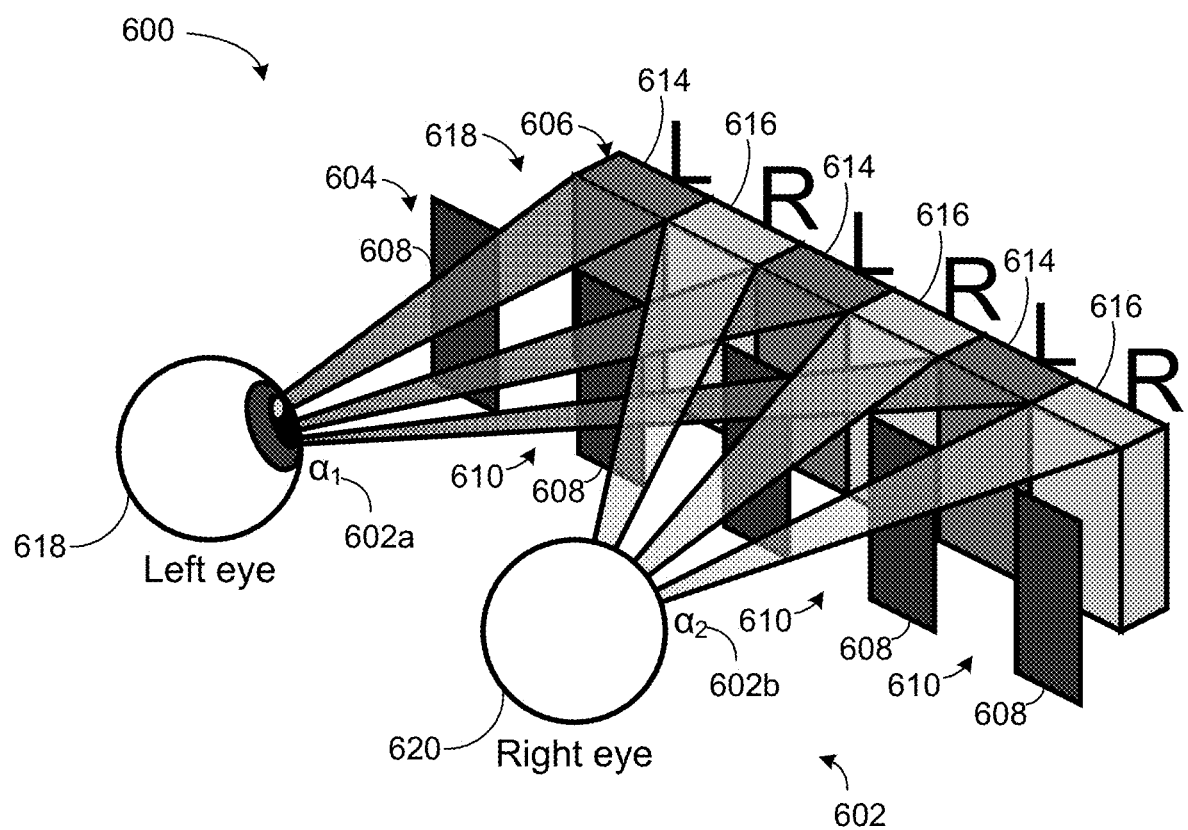
FIG. 15 diagrammatically shows a perspective view of a parallax barrier display system in accordance with an example embodiment.

Reference is now made to FIG. 15, which shows a parallax barrier display system 600 in accordance with an example embodiment. For ease of illustration, only two viewing angles 602a, 602b (each or individually referred to as 602) are described. Generally, parallax barrier type systems may be understood to produce images with an illusion of depth, or other viewing angle blocking systems such as privacy screens. For example, a parallax barrier 604 may be positioned in front of an image source, such as a video display screen or liquid crystal display, to allow it to show a stereoscopic image or multiscopic image which may not require the viewer to wear 3D glasses. Placed in front of a display 606, a parallax barrier 604 includes a layer of material which defines a series of precision slits 610, allowing each eye to see a different set of images, so creating a sense of depth through parallax in an effect similar to what lenticular printing produces for printed products. Examples of parallax barrier type systems include stereoscopic (3D) effects, animations, advertising graphics, 3D prints and 3D video displays or televisions.

Generally, the parallax barrier display system 600 may provide for different linked barcodes to each be displayed at a different viewing angle 602. As shown in FIG. 15, the parallax barrier display system 600 includes a parallax barrier 604 and a display 606. The parallax barrier 604 can include a plurality of barriers 608 which define a plurality of slits 610, apertures or channels there between. Each barrier 608 may be identical or substantially identical to another. Each slit 610 may be identical or substantially identical to another. A cavity 618 or spacing may be defined between the barriers 608 and the display 606, to facilitate the parallax effect, and may contain a suitable optically transparent medium. The display 606 includes images which are interleaved or interlaced as strips, for example a first image 614 and a second image 616, as shown. The barriers 608 may be of opaque or substantially opaque material to block or prevent parts of the display 606 from being viewed at particular viewing angles 602. Similarly, the slits 610 permit viewing of parts of the display 606 at particular viewing angles 602. In some example embodiments; the first image 614 may be associated with a first viewing angle 602*a* and the second image 616 may be associated with a second viewing angle 602*b*. Similarly, the first image 614 may be blocked from the second viewing angle 602 and the second image 616 may be blocked from the first viewing angle 602*a*. In some example embodiments, the first image 614 includes a first barcode of a series of linked barcodes and the second image 616 includes a second barcode of the series of barcodes.

For example, to achieve a 3D effect, first viewing angle 602*a* may be directed to a user's left eye 618, and second viewing angle 602*b* may be directed to a user's right eye 620. In some examples, 3D effects are achieved in a side to side (left to right) horizontal direction, with the barriers 608 and slits 610 being oriented vertically, as the viewer's left eye 618 is positioned at a slightly different viewing angle than the right eye 620 to achieve the stereoscopic effect.

In some example embodiments, the display 606 is printed, which includes two or more barcodes of the series of barcodes which may be interleaved on at least the first image 614 and the second image 616. In some example embodiments, the first image 614 and the second image 616 appear to a detector as being generally located within a same defined area, even though they are printed as different interleaved strips. In other example embodiments, the display 606 is a video display screen, with the images and barcodes being generated or rendered by a computer device. Such barcodes may be further animated in some example embodiments, providing an additional degree of encoding. In some examples, during a video display, the first barcode and the second barcode may be displayed at different times as well as at different viewing angles.

In some example embodiments, the slits 610 may contain a transparent or substantially transparent material (not shown). In some example embodiments, such material is formed of a suitable material used to assist in structural support. In some example embodiments, such material is formed of a suitable material for other purposes, such as filtering, color filtering, films, anti-glare films, etc.

In some example embodiments, a combination of lenticular lenses and parallax barriers may be used to provide for different viewing angles. For example, a "multi-parallax" system which provides for multiple viewing angles having relatively wide viewing area angles in 3D is described by Takagi et al. in United States Patent Application Publication No. 2005/0057807 entitled "Stereoscopic Image Display Device", the contents of which are herein incorporated by reference. Such a system may include both lenticular lenses and parallax barriers in combination to provide for a relatively wide viewing area angle. Two or more barcodes may be displayed on the display of such systems, at different viewing angles.

Referring again to FIG. 10, another example embodiment of detecting barcode information will now be described. For a barcode display system having multiple viewing angles, a change in viewing angle may occur due to natural movement of the code reader 200, such as passing by in a vehicle, walking by an advertisement, etc. In other example embodiments, natural detection may also occur when a viewer is stationary, for example for 3D display systems. Once the code reader application 208 has detected and captured one frame/barcode of the series, the code reader application 208 may then continue to monitor image data received from the camera 222. The code reader application 208 scans the image data in an attempt to locate a finder pattern. The code reader application 208 may, in some embodiments, attempt to identify each barcode in the series using structured append (e.g. an appropriate identifier). The code reader application 208 continues to monitor for and decode barcodes in the series of barcodes until it has all barcodes in the series. The code reader application 208 then combines the decoded information from each of the barcodes in its correct sequence. A change in viewing angle may also occur due to movement of the display screen 250, for example by mounting the display screen on a vehicle, a door, blimp, advertising banner, hanging real estate sign, etc.

In some example embodiments, the camera 222 of the code reader 200 may include a wide-angle lens or detector, which may be used to detect two or more barcodes at two or more viewing angles simultaneously. For example, in some example embodiments having a 3D display, the differential between two distinct viewing angles may be relatively small. A dual (or more) lens system may be also be used for detection of two or more barcodes at two or more viewing angles simultaneously.

Referring again to FIG. 10, in some example embodiments a mover mechanism 260 or motor is operably coupled to the code reader 200. The mover mechanism 260 may be used to move the code reader 200 to traverse at least some of the multiple viewing angles. For example, this may be performed by lateral movement or rotating movement of the code reader 200, which can be in an oscillating pattern (back-and-forth) or continuous movement.

Referring still to FIG. 10, in some example embodiments, the mover mechanism 260 is operably coupled to the display screen 250. The mover mechanism 260 may be used to move the display screen 250 to traverse at least some of the multiple viewing angles. For example, this may be performed by lateral movement or rotating movement of the display screen 250, which can be in an oscillating pattern (back-and-forth) or continuous movement.

Referring again to FIG. 13, while some example embodiments have been described as having an optical layer 404 located at or joined to a display 402, it would be appreciated that in some example embodiments the optical layer 414 may be located at other locations, such as at a detector or user. For example, not shown, the optical layer 414 may include a first lens at a first viewing angle and a second lens at a second viewing angle, which can for example correspond to the left eye and right eye. For example, the lenses may be provided on 3D glasses. The first lens and second lens may each be able to detect or filter images projected or displayed onto the display 402, but not the images of the other lens. For example, the first lens and second lens may have opposing or orthogonal polarizations, as understood in the art. Different images, which may each include a barcode from a series of barcodes, may be projected using the respective polarizations. In some examples, a first barcode displayed on the display 402 may be detected or filtered through the first lens, and a second barcode displayed on the display 402 may be detected or filtered through the second lens. Example of such 3D glasses systems may include active 3D glasses, liquid crystal shutter glasses, "Red eye" shutterglasses method, passive 3D glasses, linearly polarized glasses, circularly polarized glasses, Infitec glasses, Inficolor 3D, complementary color anaglyphs, compensating diopter glasses for red-cyan method, ColorCode 3D, chromadepth method and glasses, and anachrome "compatible" color anaglyph method. A detector device may be used to detect the barcodes at the particular viewing angles through the respective lenses.

Certain adaptations and modifications of the described embodiments can be made. Therefore, the above discussed embodiments are considered to be illustrative and not restrictive. While some of the above examples have been described as occurring in a particular order, it will be appreciated to persons skilled in the art that some of steps or processes may be performed in a different order provided that the result of the changed order of any given step will not prevent or impair the occurrence of subsequent steps. Furthermore, some of the steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa. Reference to such words as "displaying" or "detecting" could be interchanged depending on the perspective of the particular device.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY (R) Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A display system for communicating information, comprising:
    a display including a first barcode and a second barcode, the first barcode and the second barcode being of a series of two or more linked barcodes, wherein the information is encoded within the series of two or more linked barcodes; and
    an optical layer for affecting display of different images of the display at different viewing angles, the first barcode being displayed at a first viewing angle and the second barcode being displayed at a second viewing angle.

2. The display system as claimed in claim 1, wherein the display includes interleaved images which are each allocated to a respective viewing angle.

3. The display system as claimed in claim 1, wherein the first barcode and the second barcode are interleaved within a same defined area of the display.

4. The display system as claimed in claim 1, wherein the first barcode is not displayed at the second viewing angle, and the second barcode is not displayed at the first viewing angle.

5. The display system as claimed in claim 1, wherein the optical layer comprises a lenticular lens.

6. The display system as claimed in claim 1, wherein the optical layer comprises a parallax barrier.

7. The display system as claimed in claim 1, wherein the display comprises a printed image.

8. The display system as claimed in claim 1, wherein the display comprises a video display screen.

9. The display system as claimed in claim 8, wherein the first barcode and the second barcode are displayed at different times.

10. The display system as claimed in claim 1, wherein the barcodes are 2-dimensional barcodes.

11. The display system as claimed in claim 1, further comprising a mover mechanism operably coupled to the display to move the display to traverse at least some of the viewing angles.

12. A method of communicating information on a display system, the display system including a display and an optical layer for affecting display of different images of the display at different viewing angles, the method comprising:
    displaying at a first viewing angle a first barcode of a series of two or more linked barcodes, wherein the information is encoded within the series of two or more linked barcodes; and
    displaying at a second viewing angle a second barcode of the series of two or more linked barcodes.

13. The method as claimed in claim 12, further comprising:
    detecting the first barcode at the first viewing angle; and,
    detecting the second barcode at the second viewing angle.

14. The method as claimed in claim 12, wherein the display includes interleaved images which are each allocated to a respective viewing angle.

15. The method as claimed in claim 12, wherein the first barcode and the second barcode are interleaved within a same defined area of the display.

16. The method as claimed in claim 12, wherein the first barcode is not displayed at the second viewing angle, and the second barcode is not displayed at the first viewing angle.

17. The method as claimed in claim 12, wherein the optical layer comprises a lenticular lens.

18. The method as claimed in claim 12, wherein the optical layer comprises a parallax barrier.

19. The method as claimed in claim 12, wherein the display comprises a printed image.

20. The method as claimed in claim 12, wherein the display comprises a video display screen.

21. The method as claimed in claim 20, wherein the first barcode and the second barcode are displayed at different times.

22. The method as claimed in claim 12, wherein the barcodes are 2-dimensional barcodes.

23. A non-transitory computer-readable medium storing computer-readable instructions for communicating information on a display screen, wherein the display screen is affected by an optical layer for affecting display of different images of the display screen at different viewing angles, wherein the computer-readable instructions comprise:
   instructions defining a series of two or more linked barcodes, wherein the information is encoded within the series of two or more linked barcodes;
   instructions for displaying a first barcode of the series of two or more linked barcodes on the display screen, the first barcode being associated with a first viewing angle; and
   instructions for displaying a second barcode of the series of two or more linked barcodes on the display screen, the second barcode being associated with a second viewing angle.

* * * * *